(12) United States Patent
Mityagin et al.

(10) Patent No.: US 7,743,013 B2
(45) Date of Patent: Jun. 22, 2010

(54) DATA PARTITIONING VIA BUCKETING BLOOM FILTERS

(75) Inventors: Anton Mityagin, Woodinville, WA (US); Kumar Chellapilla, Redmond, WA (US); Denis Charles, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 430 days.

(21) Appl. No.: 11/811,619

(22) Filed: Jun. 11, 2007

(65) Prior Publication Data

US 2008/0307189 A1    Dec. 11, 2008

(51) Int. Cl.
*G06F 17/30* (2006.01)

(52) U.S. Cl. .............................. 707/100; 707/1; 707/10

(58) Field of Classification Search ........................ None
See application file for complete search history.

(56) References Cited

U.S. PATENT DOCUMENTS

| | | | |
|---|---|---|---|
| 5,813,000 | A | 9/1998 | Furlani |
| 6,691,109 | B2 | 2/2004 | Bjornson et al. |
| 6,795,817 | B2 | 9/2004 | Agarwal et al. |
| 6,907,422 | B1 | 6/2005 | Predovic |
| 6,920,477 | B2 | 7/2005 | Mitzenmacher |
| 6,978,458 | B1 | 12/2005 | Ghosh et al. |
| 7,080,101 | B1 | 7/2006 | Watson et al. |
| 2005/0147240 | A1* | 7/2005 | Agrawal et al. ................ 380/28 |
| 2007/0033354 | A1 | 2/2007 | Burrows et al. |
| 2007/0078827 | A1 | 4/2007 | Sareen et al. |

OTHER PUBLICATIONS

Cohen, et al., "Spectral Bloom Filters", Proceedings of the 2003 ACM SIGMOD international conference on Management of data, Date: 2003, pp. 241-252, ACM Press, New York, USA.
Li, et al., "On the Feasibility of Peer-to-Peer Web Indexing and Search", p. 1-6, http://project-iris.com/irisbib/papers/searchfeasibility:iptps03/paper.pdf.
Lu, et al., "Panaché: A Scalable Distributed Index for Keyword Search", pp. 1-10, http://pdos.csail.mit.edu/6.824-2002/projects/panache.pdf.

\* cited by examiner

*Primary Examiner*—Baoquoc N To

(57) ABSTRACT

Multiple Bloom filters are generated to partition data between first and second disjoint data sets of elements. Each element in the first data set is assigned to a bucket of a first set of buckets, and each element in the second data set is assigned to a bucket of a second set of buckets. A Bloom filter is generated for each bucket of the first set of buckets. The Bloom filter generated for a bucket indicates that each element assigned to that bucket is part of the first data set, and that each element assigned to a corresponding bucket of the second set of buckets is not part of the first data set. Additionally, a Bloom filter corresponding to a subsequently received element can be determined and used to identify whether that subsequently received element is part of the first data set or the second data set.

17 Claims, 7 Drawing Sheets

DATA PARTITIONING VIA BUCKETING BLOOM FILTERS

BACKGROUND

As computing technology has advanced, the tasks that computers have been expected to handle have increased in size and complexity. One such task is managing two or more very large sets of elements and responding to subsequent requests querying which of the sets a particular element is part of These elements can be any types of strings or integers, such as the URLs (Uniform Resource Locators) of all the Web pages on the Internet, which currently totals approximately five billion URLs. For example, a computer may be expected to keep track of the URLs of all the Web pages on the Internet as two or more separate sets of URLs, and subsequently respond to queries as to which of the sets includes a particular URL. Managing such large amounts of data can be problematic as determining which set a particular element is part of can be very time-consuming.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the data partitioning via bucketing Bloom filters, multiple Bloom filters are generated to partition data between first and second data sets of elements that are disjoint. The first and second data sets of elements are identified, and each element in the first data set is assigned to a bucket of a first set of buckets, and each element in the second data set is assigned to a bucket of a second set of buckets. A Bloom filter is generated for each bucket of the first set of buckets. The Bloom filter generated for a bucket of the first set of buckets indicates that each element assigned to that bucket is part of the first data set, and further indicates that each element assigned to a corresponding bucket of the second set of buckets is not part of the first data set.

In accordance with one or more aspects of the data partitioning via bucketing Bloom filters, data that is an element of either a first data set of elements or a second data set of elements is obtained. The first and second data sets are disjoint. Multiple Bloom filters correspond to different elements of the first data set. A single one of these multiple Bloom filters that corresponds to the element that has been obtained is determined, and this single Bloom filter is used to determine whether the obtained element is part of the first data set or part of the second data set.

BRIEF DESCRIPTION OF THE DRAWINGS

The same numbers are used throughout the drawings to reference like features.

DETAILED DESCRIPTION

Data partitioning via bucketing Bloom filters is discussed herein. Generally, the elements of two disjoint data sets are assigned to two different sets of buckets, one set of buckets corresponding to each data set. A set of Bloom filters is then generated based on the elements assigned to these buckets so that the Bloom filters can subsequently accurately identify which of the two data sets a particular element is part of. When a particular element is subsequently received, a determination is made as to which Bloom filter the particular element corresponds to. That Bloom filter is then checked to determine which of the two data sets the particular element is part of.

Figure 1:
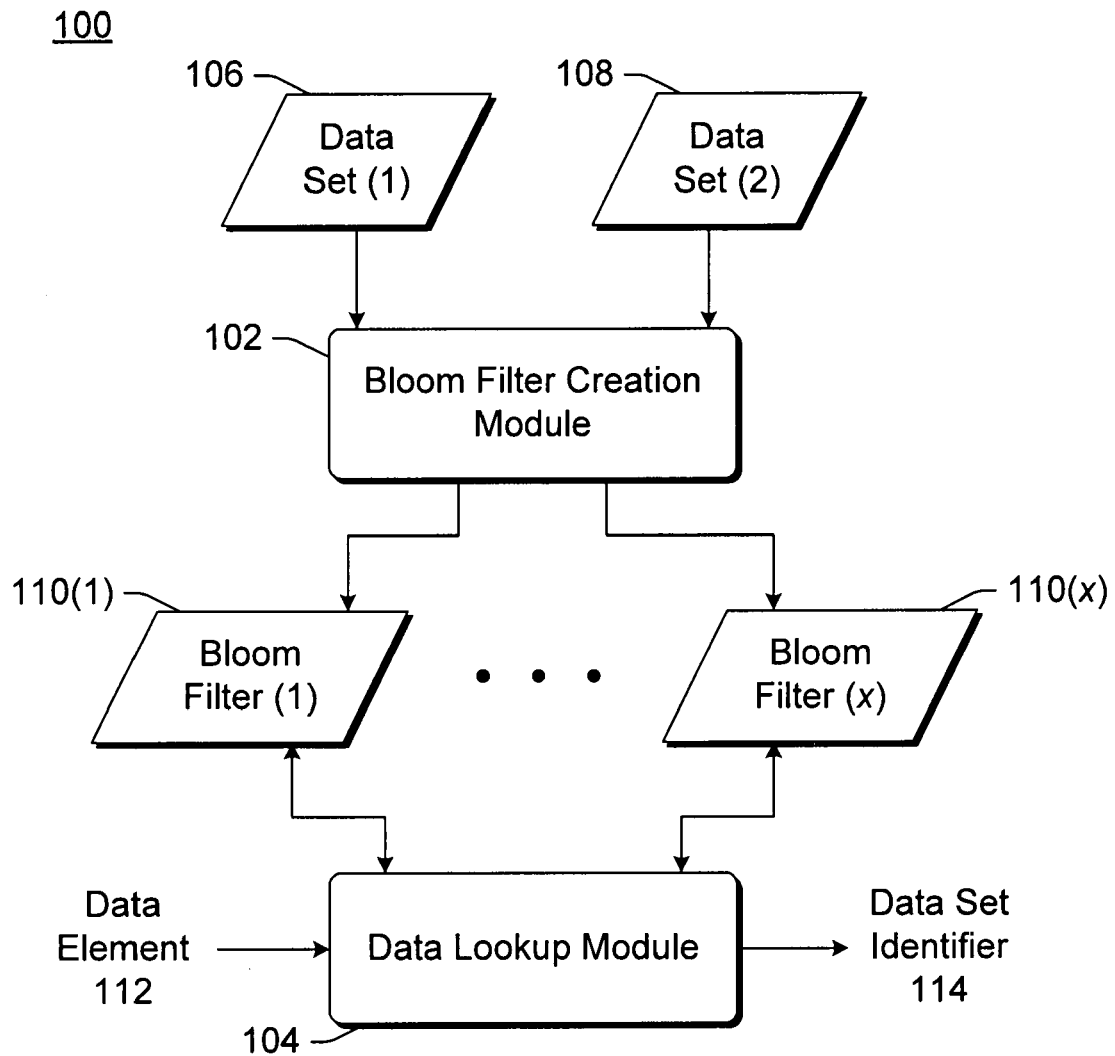
FIG. 1 illustrates an example system employing the data partitioning via bucketing Bloom filters discussed herein.

FIG. 1 illustrates an example system 100 employing the data partitioning via bucketing Bloom filters discussed herein. System 100 includes a Bloom filter creation module 102 and a data lookup module 104. Modules 102 and 104 can both be implemented as part of the same device (e.g., on the same computing device), or alternatively can be implemented as part of different devices. Furthermore, each of modules 102 and 104 can be implemented on a single device, or alternatively one or both of modules 102 and 104 can be implemented on multiple devices.

During operation, two disjoint data sets 106 and 108 are obtained by Bloom filter creation module 102. Data sets 106 and 108 being disjoint refers to the property that an element that is present in one of the two data sets is not present in the other data set. Module 102 uses data sets 106 and 108 to generate multiple (x) Bloom filters 110(1), ..., 110(x). After Bloom filters 110(1), ..., 110(x) are created, data lookup module 104 uses the Bloom filters to determine whether particular elements are part of data set 106 or data set 108. Data lookup module 104 obtains a data element 112 and accesses Bloom filters 110(1), ..., 110(x). Using one of Bloom filters 110(1), ..., 110(x), module 104 determines whether data element 112 is included in data set 106 or data set 108, and outputs a data set identifier 114 indicating whether data element 112 is included in data set 106 or data set 108.

Bloom filters 110(1), ..., 110(x) can be stored on the same device that implements module 102 and/or module 104, or alternatively Bloom filters 110(1), ..., 110(x) can be stored on one or more different devices. Additionally, the device(s) on which Bloom filters 110(1), ..., 110(x) are stored can change over time. For example, Bloom filters 110(1), ..., 110(x) may initially be stored on multiple separate devices during the process of creating the Bloom filters 110(1), ..., 110(x), and then moved to a different device(s) (e.g., the same device(s) as the device(s) on which data lookup module 104 is implemented).

The techniques described herein allow the identification of which of multiple sets a particular element is part of, and can be used with any of a variety of different data. The different data sets are typically very large, and can contain on the order of millions or billions (or more) elements. Accordingly, any of a variety of different data can be used as data sets 106 and 108. For example, the data may be URLs of Web pages on the Internet, hyperlinks between Web pages on the Internet, words in different languages, images available on the Internet, identifiers of songs or other media content, and so forth.

System 100 employs Bloom filters. Generally, a Bloom filter is a data structure that identifies whether a particular element is included in a particular data set. The Bloom filter is also referred to as memorizing the elements that are in a particular data set. The Bloom filter typically uses less space than would be required to just store all of the elements in the particular data set, and thus is a more space-efficient mechanism for determining whether an element is included in a data set. If the particular element is included in a particular data set, then the Bloom filter will accurately indicate that the element is part of the particular data set. However, it is possible that the Bloom filter will identify certain elements as being part of the particular data set even though they are not. Thus, a Bloom filter can produce false positive results, but does not produce false negative results. The creation and use of a Bloom filter is well known to those skilled in the art. Nonetheless, to assist the reader, a summary of the creation and use of a Bloom filter follows.

The creation and use of a Bloom filter relies on multiple different hash functions. A hash function is a function that operates on an element and creates a resultant hash value (typically an integer value) based on the element. This hash value is typically smaller (e.g., requires fewer bits to store) than the element itself. Using the same hash function, different elements can result in the same hash value. The number of different hash functions is a parameter of the Bloom filter that can be set by the creator of the Bloom filter. A hash function typically is a function having a particular seed value, and different seed values can be used for the same function to generate different hash functions. The Bloom filter also has as a parameter a number of bits per element that can be set by the creator of the Bloom filter. Increasing the number of bits per element decreases the probability of producing false positive results, but also increases the size of the Bloom filter. Different combinations of the number of hash functions and the number of bits per element can be used to create different probabilities of producing false positive results. These combinations are well known to those skilled in the art.

To create a Bloom filter representing a set of elements, the set of elements to be memorized by the Bloom filter is made available to the Bloom filter. A bit string is created containing a number of bits equal to the number of elements to be memorized by the Bloom filter multiplied by the number of bits per element to be used by the Bloom filter. For purposes of this discussion, we can refer to the Bloom filter as having j bits (referred to as bits 0 through j-1). Each of the j bits in this bit string is initially set to a value of zero.

For each element being memorized, multiple hash values are created by applying each of the multiple hash functions to the element. If a particular hash function(s) can result in hash values greater than j, then the result of that hash function(s) is taken mod j (or the "mod j" step can be viewed as a portion of the hash function). Thus, the final result of each hash function will be a value between 0 and j-1. For each hash value, the corresponding bit in the bit string is set to a value of one. As different hash functions can produce the same hash value for a particular element, it is to be appreciated that the same bit can be set to one because its corresponding hash value is the resultant hash value from multiple different hash functions applied to the same element. Similarly, as the same or different hash functions can produce the same hash value for different elements, it is to be appreciated that the same bit can be set to one because its corresponding hash value is the resultant hash value from the same (or different) hash function(s) applied to different elements. The bit string, as well as the hash functions used to create the bit string (the seed values used to create the hash functions is typically sufficient to identify the hash functions) is the Bloom filter.

For example, assume that two elements are to be memorized and there are to be 10 bits per element and there are five hash functions. The bit string will be 20 bits long, referred to as bits 0 to 19, and will initially have bit values as follows:
00000000000000000000.

Now, assume that the five hash functions are applied to the first element and result in hash values of 5, 3, 17, 14, and 5. Bits 3, 5, 14, and 17 of the bit string are set to 1, and the bit string will have bit values as follows:
00010100000000100100.

Further assume that the five hash functions are applied to the second element and result in hash values of 0, 19, 8, 3, and 12. Bits 0, 3, 8, 12, and 19 of the bit string are set to 1, and the bit string will have bit values as follows:
10010100100010100101.

Given a Bloom filter, in order to determine whether a particular element is part of the set represented by the Bloom filter, each of the multiple hash functions is applied to the particular element. These multiple hash functions are the same multiple hash functions (including taking the values mod j as appropriate) that were used in creating the Bloom filter. The resultant hash values are then compared to the corresponding bits of the bit string of the Bloom filter, and if all the corresponding bits are set to one then the particular element is part of the set and the Bloom filter can return a positive result. Otherwise, the particular element is not part of the set and the Bloom filter can return a negative result.

For example, assume that a value that is actually the first element in the set is subsequently provided and it is not known that it is part of the set. The hash functions are applied to the element, resulting in hash values of 5, 3, 17, 14, and 5. As bits 3, 5, 14, and 17 of the Bloom filter are set to one, the provided element is determined to be part of the set. However, further assume that another value is subsequently provided and it results in the hash values of 5, 3, 16, 8, and 12. Because at least one of these hash values (16) does not have its corresponding bit in the Bloom filter set to one, the provided value is determined to not be part of the set.

It should be noted that the Bloom filters discussed herein are discussed as having values set to one to indicate that an element has been memorized by the Bloom filter. It is to be appreciated that the Bloom filters could be implemented with the opposite settings, so that all bits of the Bloom filter are initially set to one, and each bit corresponding to a hash value of an element being memorized is set to zero.

Returning to FIG. 1, Bloom filter creation module 102 creates and uses multiple Bloom filters 110 to partition data between the two data sets 106 and 108. Different subsets of data sets 106 and 108 correspond to different Bloom filters 110. Which subsets correspond to which Bloom filter 110 is determined by creation module 102, as discussed in more detail below.

Figure 2:
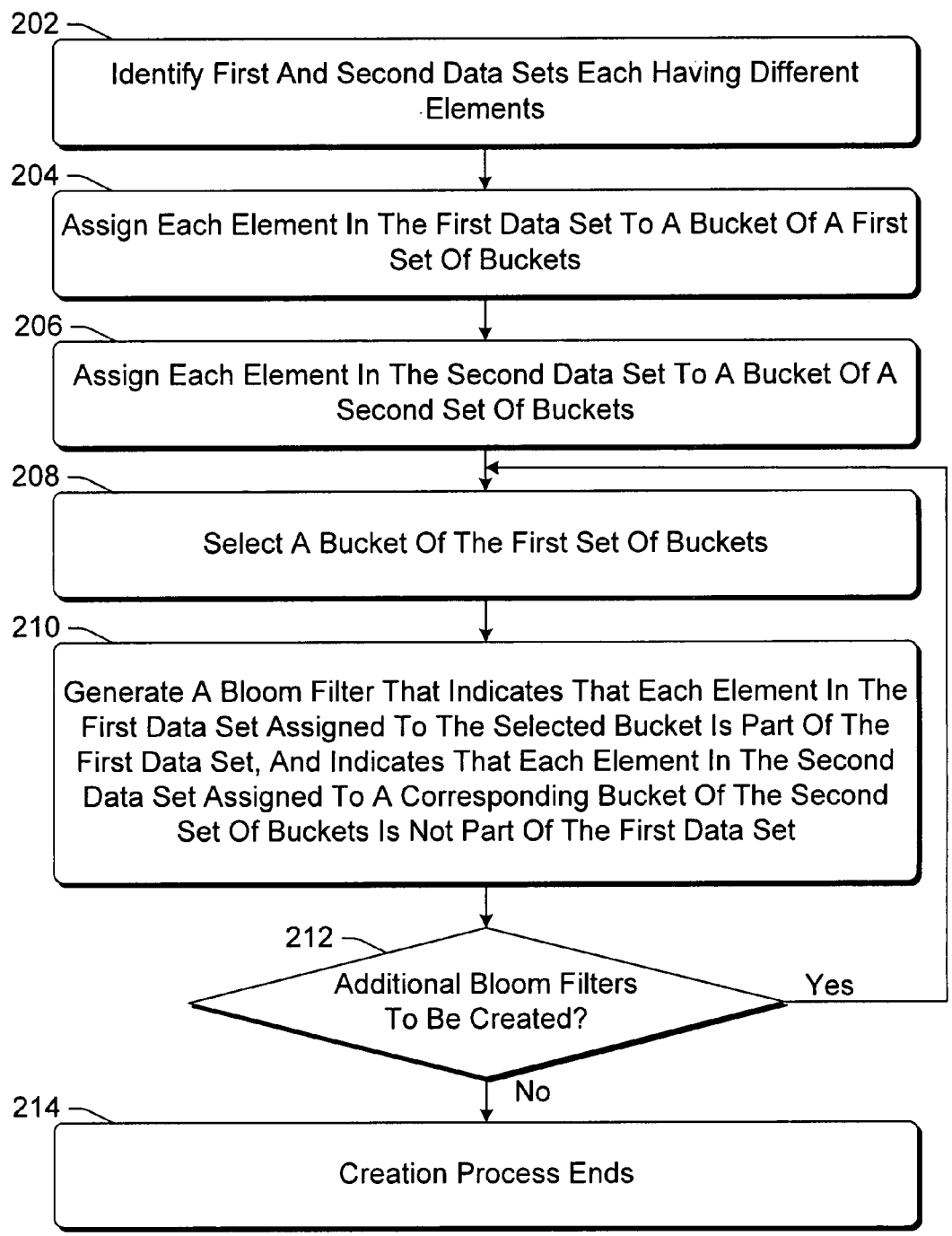
FIG. 2 is a flowchart illustrating an example process for creating Bloom filters for partitioning data between two data sets.

FIG. 2 is a flowchart illustrating an example process 200 for creating Bloom filters for partitioning data between two data sets. Process 200 can be performed by Bloom filter creation module 102 of FIG. 1, and can be implemented in software, firmware, hardware, or combinations thereof.

Initially, first and second data sets are identified (act 202). As discussed above, these two data sets are disjoint. Each element in the first data set is assigned to a bucket of a first set of buckets according to some criteria (act 204). Each element in the second data set is assigned to a bucket of a second set of buckets according to the same criteria as was used in act 204 (act 206). There are fewer buckets in each bucket set than there are elements in each data set, so multiple elements are typically assigned to the same bucket. The criteria used in acts 204 and 206 is typically selected so that an average of between 5 and 100 elements is assigned to each bucket, although the average number of elements per bucket may alternatively be less than 5 or greater than 100.

The criteria that are used in acts 204 and 206 can take any of a variety of forms. For example, particular hash functions can be applied to the elements to assign them to buckets, other types of functions or algorithms can be applied to the elements to assign them to buckets, a particular set or sets of rules can be applied to the elements to assign them to buckets, and so forth. Whatever criteria are used in acts 204 and 206, the criteria should distribute the elements of the data sets approximately evenly across the buckets of each set of buckets. For example, criteria that assigned the elements to buckets so that each bucket had between 25 and 75 elements would be better than criteria that assigned all of the elements to just one or two of the buckets.

In one or more embodiments, the criteria used in acts 204 and 206 is a hash function. The number of elements in each of the two data sets is determined and a number n is determined that is equal to the number of elements in the larger of the two data sets. Additionally, a parameter m is set that identifies the average number of elements in a bucket (as discussed above, m is typically between 5 and 100). A hash function is then selected which maps the elements of both data sets to a range of integers $[0, \ldots, (n/m-1)]$. A portion of the hash function can be viewed as being a mod n/m step to ensure that the hash value does not exceed (n/m-1).

The hash function is then used to map each element in the first data set to a bucket of the first set of buckets. This mapping for an element is performed by applying the hash function to the element to generate a hash value, and assigning the element to the bucket identified by that hash value. For example, if there are 1000 buckets and the hash value for an element is 573, then the element is mapped to the $573^{rd}$ bucket of the first set of buckets.

The same hash function is then used to map each element in the second data set to a bucket of the second set of buckets. This mapping for an element is performed by applying the hash function to the element to generate a hash value, and assigning the element to the bucket identified by that hash value. For example, if there are 1000 buckets and the hash value for an element is 421, then the element is mapped to the $421^{st}$ bucket of the second set of buckets.

Figure 3:
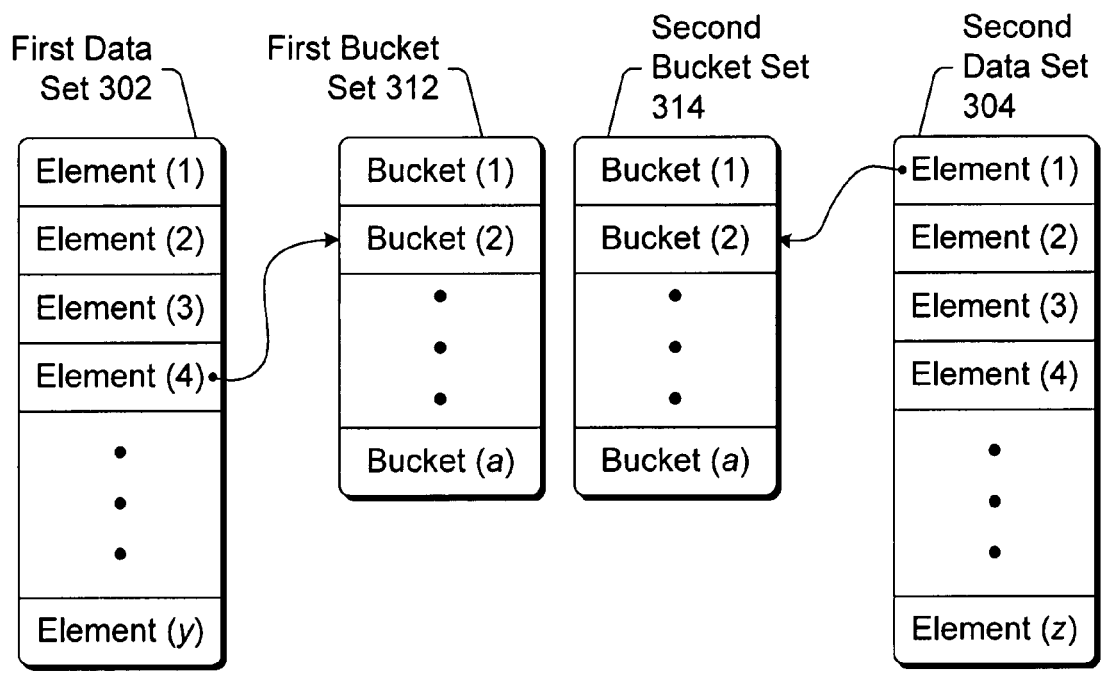
FIG. 3 illustrates an example of assigning elements to buckets.

FIG. 3 illustrates an example of assigning elements to buckets. In the illustrated example of FIG. 3, a first data set 302 has y elements and a second data set 304 has z elements. The values y and z can be different and either of the two can be larger, or alternatively the values y and z can be the same. Elements of the first data set 302 are assigned to one of the a buckets of a first bucket set 312. For example, as illustrated element (4) of data set 302 is assigned to bucket (2) of bucket set 312. Elements of the second data set 304 are assigned to one of the a buckets of the second bucket set 314. For example, as illustrated element (1) of data set 304 is assigned to bucket (2) of bucket set 314.

Returning to FIG. 2, the assignment of elements to buckets can be maintained in different manners. For example, each bucket can be represented by a data structure that stores information identifying the multiple elements assigned to that bucket. In one or more embodiments, the data structure for each bucket stores the particular elements that are assigned to that bucket.

In one or more other embodiments, the data structure for each bucket stores another identifier of the particular elements that are assigned to that bucket, such as hash values generated by applying a hash function to the particular elements. This hash function can be the same hash function as discussed above in acts 204 and 206, or alternatively can be a separate hash function. For example, when assigning a particular element to a particular bucket, the hash function discussed above in acts 204 and 206 can be applied to that particular element and the resultant hash value can be used to assign that particular element to the appropriate bucket. The resultant hash value mod p (p is another value, such as the total number of bits that are desired to be used for each element, such as 16 bits or 32 bits) can also be stored in that particular bucket as an identifier of that particular element. As discussed above, in order to assign the element to bucket in the range $[0, \ldots, (n/m-1)]$, a mod n/m step can be performed as part of the hash function or on the hash value resulting from the hash function. In the current example, the resultant hash value that is taken mod p is the hash value obtained from the hash function before the mod n/m step.

By way of another example, the hash value that results by applying the hash function discussed above in acts 204 and 206 to an element can be used to identify both the bucket that the element is assigned to as well as the value to store in that bucket (e.g., a beginning portion of the hash value (such as a number of bits that are needed to identify the total number of buckets desired) can be used to identify which bucket the element is assigned to, and the remaining portion of the hash value can be stored in that bucket as the information identifying that element). The hash value used in this example is typically the result of the hash value after the mod n/m step is performed.

Each bucket in the first set of buckets has a corresponding bucket in the second set of buckets. Typically, each bucket in the first set of buckets is assigned an index value (e.g., ranging from 1 to a), and each bucket in the second set of buckets is also assigned an index value (e.g., ranging from 1 to a). Buckets in the two bucket sets having the same index value correspond to each other (e.g., in FIG. 3 bucket (2) of bucket set 312 corresponds to bucket (2) of bucket set 314).

After the elements are assigned to the buckets in acts 204 and 206, a Bloom filter is generated or created for each bucket (acts 208-212). Each of these Bloom filters corresponds to or is associated with one of the buckets of the first set of buckets, and also corresponds to or is associated with the corresponding bucket of the second set of buckets.

Initially, a bucket of the first set of buckets is selected (act 208). This initial bucket can be selected in any manner (e.g., by index number of the buckets, randomly, according to some other algorithm or criteria, etc.). A Bloom filter corresponding to the selected bucket is then generated (act 210). The Bloom filter generated in act 210 indicates, when subsequently used, that each element in the first data set that is assigned to the selected bucket is part of the first data set. Additionally, the Bloom filter generated in act 210 indicates, when subsequently used, that each element in the second data set that is assigned to the corresponding bucket of the second set of buckets is not part of the first data set. By constructing the Bloom filter in this manner, it can be ensured that any subsequent checks for whether an element of the second data set that is assigned to the corresponding bucket of the second set of buckets will indicate that the element is not part of the first data set. The nature of the Bloom filter itself, as discussed above, ensures that any subsequent checks for whether an element of the first data set that is assigned to that bucket will indicate that the element is indeed part of the first data set.

Multiple Bloom filters are created by process 200, one Bloom filter for each of the buckets in the first set of buckets for which data elements are assigned to either that bucket or its corresponding bucket in the second set of buckets. Typically, a Bloom filter is created for each bucket in the first set of buckets. Each of these Bloom filters corresponds to one of the buckets in the first set of buckets. In one or more embodiments, the Bloom filter is identified in the same manner as the buckets in the sets of buckets are identified. For example, as discussed above each bucket may be identified by an index value and elements can be assigned to the buckets by generating a hash value for the element that is used as the index value to identify a bucket. This same indexing can be used to identify the Bloom filters, so that a hash value of an element can be determined and that hash value is used as an index value to identify one of the Bloom filters.

It should be noted that one or more of the acts in process 200 can be performed concurrently. For example, multiple buckets can be selected and Bloom filters generated for each bucket in act 210 concurrently by the same device or alternatively by different devices.

It should also be noted that, once all the Bloom filters are created, the buckets need no longer be maintained. The Bloom filters are used for the data lookup process, as discussed in more detail below, but the buckets need not be used.

Figure 4:
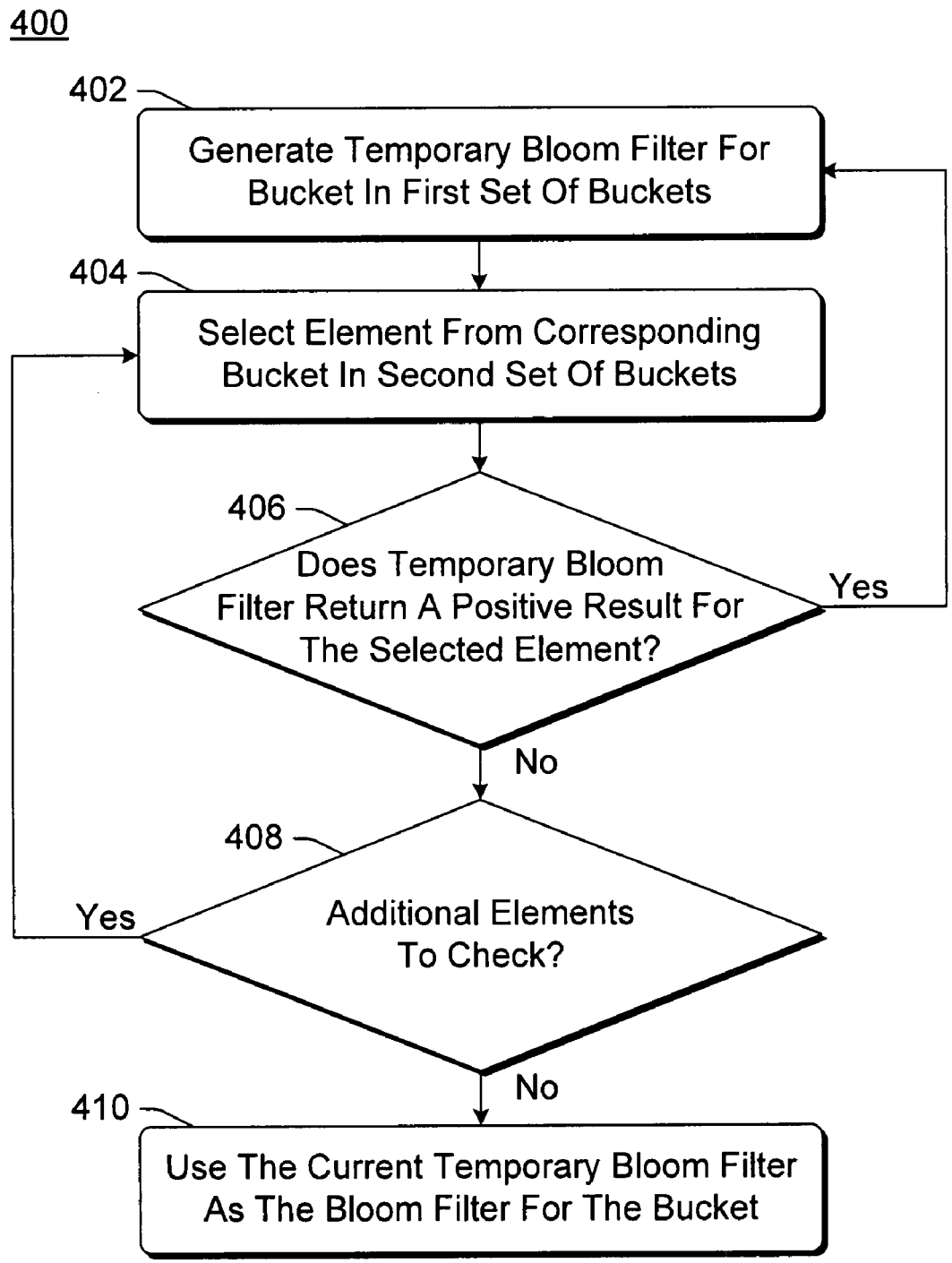
FIG. 4 is a flowchart illustrating an example process for creating a Bloom filter corresponding to a bucket.

FIG. 4 is a flowchart illustrating an example process 400 for creating a Bloom filter corresponding to a bucket. Process 400 can be implemented in software, firmware, hardware, or combinations thereof. In one or more embodiments, process 400 performs the generation of act 210 of FIG. 2.

Initially, a temporary Bloom filter for a bucket in the first set of buckets is generated (act 402). This Bloom filter generated in act 402 can be viewed as a temporary Bloom filter because it is not known yet whether this Bloom filter will be an acceptable Bloom filter for this bucket. The temporary Bloom filter is generated in act 402 as discussed above in the discussion of Bloom filters, and the elements from the first data set that are assigned to the bucket for which the temporary Bloom filter is being generated are the elements that are memorized by the Bloom filter. As discussed above, these elements can be the actual elements from the first data set, or alternatively can be other information representing those element (such as hash values). Upon the completion of act 402, the temporary Bloom filter has memorized the elements in the bucket from the first data set.

An element from the second set of buckets corresponding to the bucket for which the temporary Bloom filter was generated in act 402 is then selected (act 404). Elements form this corresponding bucket can be selected in any order. A check is then made as to whether the temporary Bloom filter returns a positive result for the selected element (act 406). A positive result from the temporary Bloom filter would indicate that the selected element was memorized by the temporary Bloom filter. As the temporary Bloom filter should not return a positive value for any of the elements in the corresponding bucket from the second set, process 400 returns to generate a new temporary Bloom filter. This new temporary Bloom filter is created using different hash functions than were used to generate any previous temporary Bloom filter(s) for this bucket (e.g., using different seed values for the hash functions than were previously used).

However, if the Bloom filter does not return a positive result for the selected element in act 406, a check is made as to whether there are any elements in the corresponding bucket from the second set that have not yet been checked for the current temporary Bloom filter (act 408). If any elements in the corresponding bucket have not yet been checked in act 406, process 400 returns to act 404 to select one of those elements. However, if all elements in the corresponding bucket have been checked, then the current temporary Bloom filter is used as the Bloom filter associated with the bucket (act 410). Thus, new temporary Bloom filters continue to be created and checked to make sure that no elements in the corresponding bucket from the second set of buckets returns a positive result; once such a temporary Bloom filter is found, that temporary Bloom filter is used as the Bloom filter for the bucket.

Returning to FIG. 2, different parameters can be employed when creating a Bloom filter as discussed above. The parameters used when generating different Bloom filters for different selected buckets in act 210 can be different, or alternatively the parameters can be the same. In one or more embodiments, the parameters for each Bloom filter are selected so that each Bloom filter has a probability of false positives of $2^{-|Bi|}$, where Bi refers to the size of the corresponding bucket in the second set of buckets.

A check is then made as to whether there are additional Bloom filters to be created (act 212). If a Bloom filter has been created for all of the non-empty buckets in the first and second set of buckets, then no additional Bloom filters need be made and the creation process ends (act 214). However, if there are any buckets in the first or second set of buckets to which at least one element has been assigned but no Bloom filter has been created yet, then process 200 returns to act 208 where one of the non-empty buckets in the first set of buckets (or one of the buckets in the first set of buckets corresponding to a non-empty bucket of the second set of buckets) is selected.

Table I illustrates example pseudocode for creating Bloom filters for partitioning data between two data sets. In one or more embodiments, the example pseudocode of Table I can be used to implement process 200 of FIG. 2. The pseudocode of Table I has as input two disjoint data sets S0 and S1; elements that are part of set S0 are not part of set S1, and elements that are part of set S1 are not part of set S0. The output of the pseudocode of Table I is a set of Bloom filters BF1, . . . , BFn/m. Additionally, the pseudocode of Table I has as a parameter m, which is the average number of elements in a bucket (e.g., typically between 5 and 100).

TABLE I

1  Determine n - the maximum of sizes of S0 and S1
2  Determine a pseudorandom function H(.) which maps elements of
   both sets S0, S1 to the range of integers [1, . . . , n/m]
3  Apply H(.) to all elements of S0 and execute the bucket-sort
   algorithm; create sets A1, . . . , An/m, where
      Ai = {x \ S0 | H(x) = i}
4  Apply H(.) to all elements of S1 and execute the bucket-sort
   algorithm; create sets B1, . . . , Bn/m, where
      Bi = {x \ S1 | H(x) = i}
5  For all i = 1, . . . , n/m do:
      Select a random seed for the Bloom filter
      Construct a Bloom filter BF for the set Ai; choose parameters for
      BF (depending on sizes of Ai and Bi) to achieve a probability of
      false positives of $2^{-|Bi|}$
      Test if BF(x) = 0 for all x \ Bi
         If BF fails on any of the elements from Bi (that is, BF(x) =
         1 for some x \ Bi), repeat the previous step with
         a new random seed
         If BF succeeds, store BF as BFi
   Return BF1, . . . , BFn/m In Table I at line 1, the value n is set as the larger of the sizes of the two data sets S0 and S1. At line 2, the hash function to be used to assign or map elements of the data sets to a particular bucket is determined as the pseudorandom function H(.). At line 3, the function H(.) is applied to all of the elements of set S0 to assign the elements of S0 to one of a first set of buckets, which is buckets A1, ..., An/m. At line 4, the function H(.) is applied to all of the elements of set S1 to assign the elements of S1 to one of a second set of buckets, which is buckets B1, ..., Bn/m. At line 5, a Bloom filter is generated for each bucket as discussed above with respect to act 210 of FIG. 2. At line 5, the value BF(x)=0 indicates that the Bloom filter returns a negative result for x, indicating that the element x was not memorized by the Bloom filter.

Figure 5:
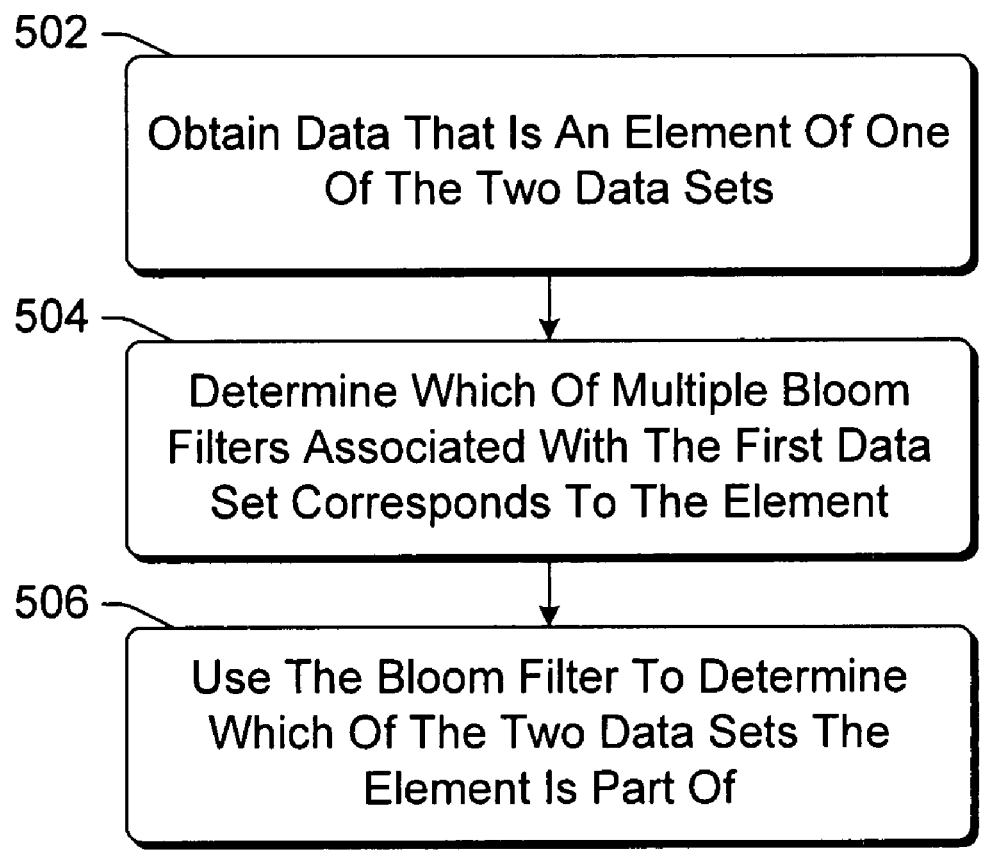
FIG. 5 is a flowchart illustrating an example process for using the created Bloom filters to determine data set membership of an element.

FIG. 5 is a flowchart illustrating an example process 500 for using the created Bloom filters to determine data set membership of an element. Process 500 can be performed by data lookup module 104 of FIG. 1, and can be implemented in software, firmware, hardware, or combinations thereof.

Initially, data that is an element of one of the two data sets is obtained (act 502). The element can be obtained in a variety of different manners, such as by having the element or an identifier of where to obtain the parameter passed to process 500 as a parameter, having the element or an identifier of where to find the element stored in a location known by process 500, and so forth. A determination is then made as to which of multiple Bloom filters associated with the first of the two data sets corresponds to the received element (act 504). This determination in act 504 is made using the same criteria as was used in acts 204 and 206 of FIG. 2 discussed above, and the multiple Bloom filters are the multiple Bloom filters that were generated in act 210 of FIG. 2 discussed above. For example, if a hash function was used in acts 204 and 206 of FIG. 2 to assign elements to buckets, then that same hash function with the same seed values is used in act 504 to determine which Bloom filter is associated with the received element.

Once the Bloom filter associated with the obtained element is identified in act 504, that Bloom filter is used to determine which of the two data sets the element is part of (act 506). If the Bloom filter returns a positive value for the received element, then the received element is part of the first data set (that is, the data set that was referred to as the first data set during the creation process 200 of FIG. 2). However, if the Bloom filter returns a negative value for the received element, then the received element is part of the second data set (that is, the data set that was referred to as the second data set during the creation process 200 of FIG. 2).

The Bloom filter operates as discussed above to return a positive or negative value. For example, the same multiple hash functions previously used to create the Bloom filter are used to generate hash values for the received element, and the bits of the Bloom filter identified by those hash values are checked to see if they are set to one. If all the bits identified by the generated hash values are set to one then the Bloom filter returns a positive value, whereas if one or more of the bits identified by the generated hash values are not set to one then the Bloom filter returns a negative value.

It should also be noted that the techniques discussed herein can be used in situations where it is not guaranteed that an element obtained in act 502 is an element of one of the two data sets. In such situations, the result returned in act 506 is an indication of whether the obtained element is an element of the first data set. Returning a positive value in act 506 indicates that the element is an element of the first data set. Returning a negative value in act 506 indicates that the element is not an element of the first data set, but it is not guaranteed that the element is part of the second data set.

Table II illustrates example pseudocode for using the created Bloom filters to determine data set membership of an element. In one or more embodiments, the example pseudocode of Table II can be used to implement process 500 of FIG. 5. The pseudocode of Table II is discussed with reference to the data sets and pseudocode discussed above with reference to Table I. The pseudocode of Table II has as input an element x and the created Bloom filters. The output of the pseudocode of Table II is an indication of whether element x is a part of data set S0.

TABLE II

| 1 | Compute the bucket number i = H(x) |
| 2 | Retrieve Bloom filter BFi from the set of Bloom filters |
| 3 | Return BFi(x) |

In Table II at line 1, the appropriate bucket number or Bloom filter index i is determined by applying the hash function H(.) to the input element x. At line 2, the Bloom filter indicated by the hash function in line 1 is retrieved. At line 3, the retrieved Bloom filter is used to determine whether the element x was memorized by the retrieved Bloom filter and the result of that determination is returned. For example, a value of 0 can be returned to indicate a negative result (that the element x was not memorized by the retrieved Bloom filter and thus is not a member of data set S0), and a value of 1 can be returned to indicate a positive result (that the element x was memorized by the retrieved Bloom filter, and thus is a member of data set S0).

The techniques discussed herein allow for data partitioning using bucketing Bloom filters with numerous advantages. The creation time for constructing the Bloom filters for different data sets increases approximately linearly as the number of elements in the data sets increases. Additionally, the amount of time necessary to determine data set membership of an element is approximately constant regardless of the sizes of the data sets. Furthermore, the bucketing allows, for the elements in the data set being memorized, the number of bits per element that are used for the Bloom filters to be reduced compared to using a single Bloom filter for the entire data set, and the number of bits per element that are used for the Bloom filters further remains approximately constant regardless of the size of the data sets. This results in reduced storage space requirements for the bloom filters as well as increased speed when determining data set membership as compared to using a single Bloom filter for the entire data set.

The discussions herein often refer to partitioning data between two data sets. It is to be appreciated, however, that the techniques discussed herein can be similarly applied to partitioning data among three or more data sets. When partitioning data among three or more data sets, the data sets are grouped and combined as appropriate so that the data is partitioned between two data sets multiple times, and each of these multiple times the techniques discussed herein for partitioning data between two data sets are used. The data sets can be combined to generate two larger data sets, each of which can include one or more data subsets. The two larger data sets are used by process 200 of FIG. 2 to create a Bloom filter set. Additionally, for each of the larger data sets, process 200 is used recursively on the data subsets within that larger data set to generate additional Bloom filter sets.

Figure 6:
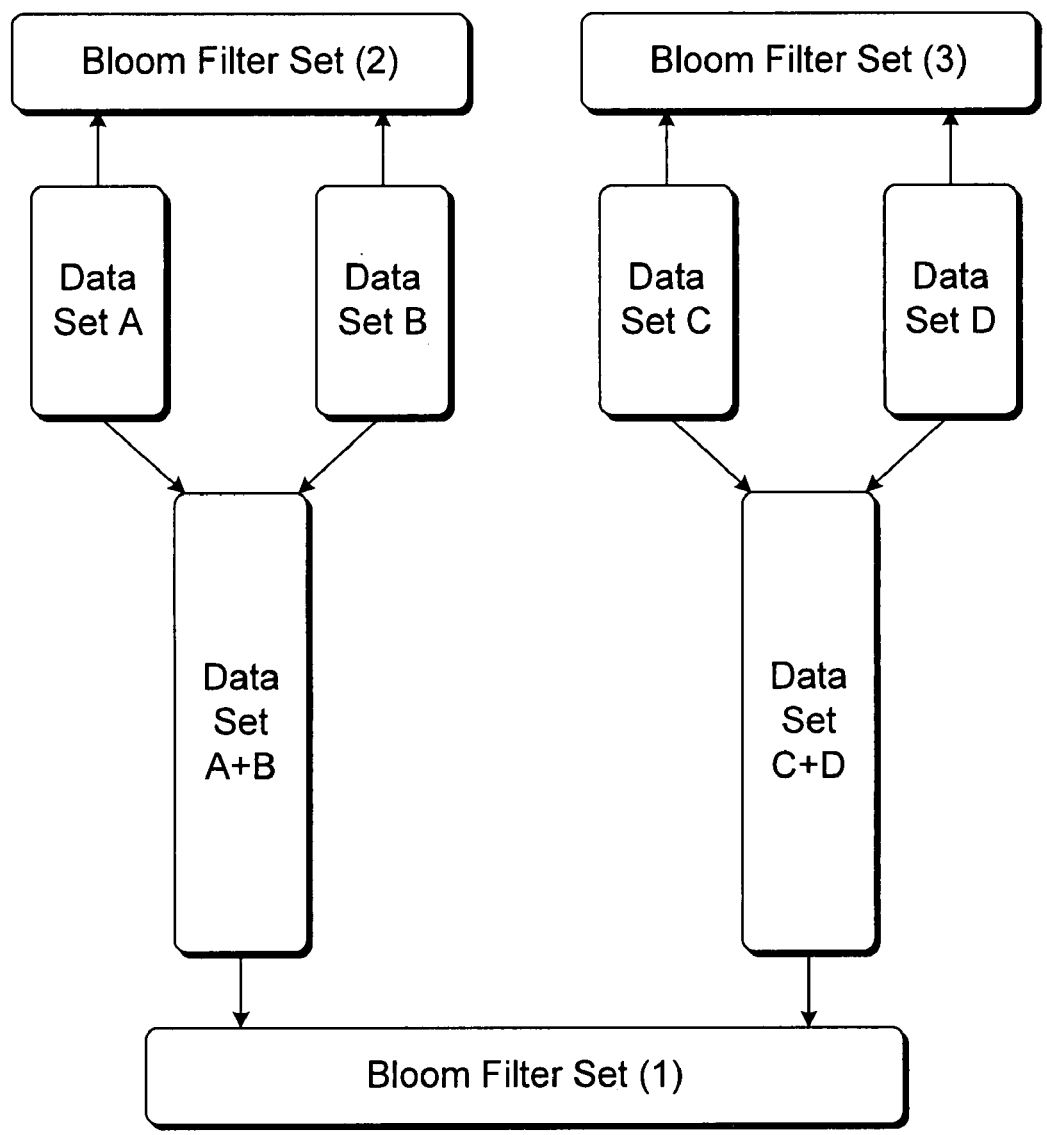
FIG. 6 illustrates an example partitioning of data among four data sets in accordance with one or more embodiments.

FIG. 6 illustrates an example partitioning of data among four data sets in accordance with one or more embodiments. In FIG. 6, it is assumed that data is to be partitioned among four data sets: data set A, data set B, data set C, and data set D. Data sets A and B are combined to create data set A+B, so data set A and data set B are both data subsets of data set A+B. Data sets C and D are combined to create data set C+D, so data set C and data set D are both data subsets of data set C+D. The data partitioning techniques discussed above are used to create Bloom filter set (1) that partitions data between data set A+B and data set C+D. The data partitioning techniques discussed above are also used to create Bloom filter set (2) that partitions data between data set A and data set B, and also to create Bloom filter set (3) that partitions data between data set C and data set D. Process 200 of FIG. 2 is performed three times: once to create Bloom filter set (1), once to create Bloom filter set (2), and once to create Bloom filter set (3).

These three sets of Bloom filters allow the data to be partitioned among the four data sets A, B, C, and D. For example, if an element that is a member of one of data sets A, B, C, or D is obtained, Bloom filter set (1) can be used to identify whether the element is a member of data set A+B or data set C+D. If the element is a member of data set A+B, then Bloom filter set (2) can be used to identify whether the element is a member of data set A or data set B. Or, if the element is a member of data set C+D, then Bloom filter set (3) can be used to identify whether the element is a member of data set C or data set D.

This same technique can similarly be used to partition data among three data sets as well as among five or more data sets. For example, following the example of FIG. 6, if data were to be partitioned among three data sets, then assume data set D is not present. Bloom filter set (3) would not be created, and there would not be a combined data set C+D. Rather, Bloom filter set (2) would partition data between data set A and data set B, and Bloom filter set (1) would partition data between data set A+B and data set C.

A general process for applying this technique to partition data among three or more sets is as follows. Assume that a set S is to be partitioned into k disjoint subsets $S_0, \ldots, S_k$. Let $S_{00000}, \ldots, S_{[k]}$ be the indices written in binary, where [k] is the binary expansion (in bits) of k. A partition Bloom filter PB_1 that separates the set $R_0$ from $R_1$ is built, with $R_0$ being the set of all elements belonging to $S_{[i]}$ where the leading bit of the binary expansion of i is 0, and with $R_1$ being the set of all elements belonging to $S_{[i]}$ where the leading bit of the binary expansion of i is 1. A partition Bloom filter is then built recursively for each of the subsets $R_0$ and $R_1$ which have one less bit in their binary expansion. In this manner a tree of 2 k-1 partition Bloom filters is created, with the depth of the tree being $\log_2(k)$.

Figure 7:
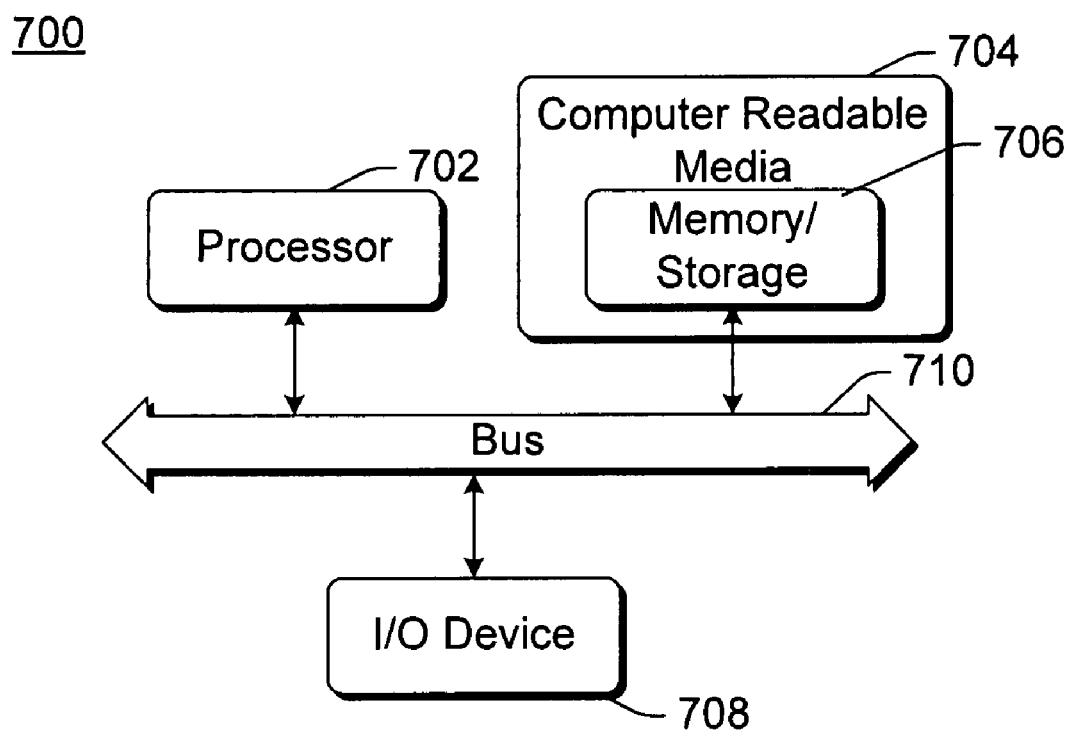
FIG. 7 illustrates an example computing device that can be configured to implement the data partitioning via bucketing Bloom filters in accordance with one or more embodiments.

FIG. 7 illustrates an example computing device 700 that can be configured to implement the data partitioning via bucketing Bloom filters in accordance with one or more embodiments. Computing device 700 can implement, for example, Bloom filter creation module 102 and/or data lookup module 104 of FIG. 1.

Computing device 700 includes one or more processors or processing units 702, one or more computer readable media 704 which can include one or more memory and/or storage components 706, one or more input/output (I/O) devices 708, and one or more busses 710 that allows the various components and devices to communicate with one another. Computer readable media 704 and/or I/O device(s) 708 can be included as part of, or alternatively may be coupled to, computing device 700. Bus 710 represents one or more of any of several types of bus structures, including a memory bus or memory controller, a peripheral bus, an accelerated graphics port, and a processor or local bus using any of a variety of bus architectures. Bus 710 can include wired and/or wireless buses.

Memory/storage component 706 represents one or more computer storage media. Component 706 can include volatile media (such as random access memory (RAM)) and/or non-volatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon instructions that, when executed by one or more processors of a computing device, cause the one or more processors to:
   identify a first data set of elements and a second data set of elements, wherein the first data set and the second data set are disjoint;
   assign each element in the first data set to a bucket of a first set of buckets;
   assign each element in the second data set to a bucket of a second set of buckets; and generate, for each bucket of the first set of buckets, a Bloom filter that indicates that each element assigned to the bucket of the first set of buckets is part of the first data set, and that indicates that each element assigned to a corresponding bucket of the second set of buckets is not part of the first data set, wherein to assign each element in the first data set to the bucket of the first set of buckets is to, for each element in the first data set:
generate a hash value for the element by applying a hash function to the element; and
assign the element to one bucket of the first set of multiple buckets that corresponds to the hash value for the element; and to assign each element in the second data set to the bucket of the second set of buckets is to, for each element in the second data set:
generate a hash value for the element by applying the hash function to the element; and
assign the element to one bucket of the second set of multiple buckets that corresponds to the hash value for the element.

2. One or more computer storage media as recited in claim 1, each bucket in the first set of multiple buckets having one corresponding bucket in the second set of multiple buckets, with corresponding buckets being identified by a same index value.

3. One or more computer storage media as recited in claim 1, wherein to assign each element in the first data set to the bucket of the first set of buckets is further to, for each element in the first data set, store a portion of the hash value for the element in a data structure representing the one bucket.

4. One or more computer storage media having stored thereon instructions that, when executed by one or more processors of a computing device, cause the one or more processors to:
identify a first data set of elements and a second data set of elements, wherein the first data set and the second data set are disjoint;
assign each element in the first data set to a bucket of a first set of buckets;
assign each element in the second data set to a bucket of a second set of buckets; and
generate, for each bucket of the first set of buckets, a Bloom filter that indicates that each element assigned to the bucket of the first set of buckets is part of the first data set, and that indicates that each element assigned to a corresponding bucket of the second set of buckets is not part of the first data set,
wherein to generate the Bloom filter for a first bucket of the first set of buckets is to:
generate a temporary Bloom filter for the first bucket;
for each of one or more elements in a second bucket of the second set of buckets, the first bucket corresponding to the second bucket, check whether the temporary Bloom filter returns a positive result for the element, the positive result indicating that the element was memorized by the temporary Bloom filter;
if the temporary Bloom filter returns the positive result for none of the elements of the second bucket, then use the temporary Bloom filter as the Bloom filter for the first bucket; and
if the temporary Bloom filter returns the positive result for at least one of the elements of the second bucket, then repeatedly generate new temporary Bloom filters until a temporary Bloom filter that returns the positive result for none of the elements of the second bucket is generated.

5. One or more computer storage media as recited in claim 4, wherein to generate the new temporary Bloom filters is to use a new seed value for a set of hash functions used to create the new temporary Bloom filters.

6. One or more computer storage media as recited in claim 1, wherein to assign each element in the first data set to the bucket of the first set of buckets is to, for each element in the first data set, store the hash value generated by applying the hash function to the element in a data structure representing the bucket to which the element is assigned.

7. One or more computer storage media as recited in claim 1, wherein to assign each element in the first data set to the bucket of the first set of buckets is to, for each element in the first data set, store the element in a data structure representing the bucket to which the element is assigned.

8. One or more computer storage media as recited in claim 1, wherein the instructions further cause the one or more processors to partition data among three or more data sets by repeating the identification, both of the assignments, and the generation recursively with additional data subsets of one or both of the first data set and the second data set.

9. One or more computer storage media as recited in claim 1, wherein the instructions further cause the one or more processors to:
obtain data that is an element of either the first data set of elements or the second data set of elements;
determine a single Bloom filter that corresponds to the element, the single Bloom filter being one of multiple Bloom filters associated with the first data set, each of the multiple Bloom filters corresponding to different elements of the first data set; and
use the single Bloom filter to determine whether the element is part of the first data set of elements or the second data set of elements.

10. A method of creating a set of Bloom filters to partition data into two disjoint data sets, the method comprising:
assigning elements of each of the two disjoint data sets to a bucket of a corresponding set of buckets; and
generating the set of Bloom filters, each Bloom filter corresponding to one bucket corresponding to a first data set of the two disjoint data sets, each Bloom filter indicating that each element in the first data set is part of the first data set, and further indicating that each element in a second data set of the two data sets is not part of the first data set,
wherein assigning elements of each of the two disjoint data sets to a bucket of a corresponding set of buckets comprises:
for each element in the first data set:
generating a hash value for the element by applying a hash function to the element; and
assigning the element to one bucket of a first set of buckets corresponding to the first data set, the one bucket corresponding to the hash value for the element; and
for each element in the second data set:
generating a hash value for the element by applying the hash function to the element; and
assigning the element to one bucket of a second set of buckets corresponding to the second data set, the one bucket corresponding to the hash value for the element.

11. A method as recited in claim 10, further comprising for each element in the first data set, storing a portion of the hash value for the element in a data structure representing the one bucket of the first set of buckets.

12. A method as recited in claim 10, wherein assigning elements of the first data set to a bucket of a corresponding set of buckets further comprises, for each element in the first data set, storing the hash value generated by applying the hash function to the element in a data structure representing the bucket to which the element is assigned.

13. A method as recited in claim 10, wherein assigning elements of the first data set to a bucket of a corresponding set of buckets further comprises, for each element in the first data set, storing the element in a data structure representing the bucket to which the element is assigned.

14. A method of creating a set of Bloom filters to partition data into two disjoint data sets, the method comprising:
assigning elements of each of the two disjoint data sets to a bucket of a corresponding set of buckets; and
generating the set of Bloom filters, each Bloom filter corresponding to one bucket corresponding to a first data set of the two disjoint data sets, each Bloom filter indicating that each element in the first data set is part of the first data set, and further indicating that each element in a second data set of the two data sets is not part of the first data set,
the generating comprising, for a first bucket in the set of buckets corresponding to the first data set:
generating a temporary Bloom filter for the first bucket;
for each of one or more elements in a second bucket of the set of buckets corresponding to the second data set, the first bucket corresponding to the second bucket, checking whether the temporary Bloom filter returns a positive result for the element, the positive result indicating that the element was memorized by the temporary Bloom filter;
if the temporary Bloom filter returns the positive result for none of the elements of the second bucket, then using the temporary Bloom filter as the Bloom filter for the first bucket; and
if the temporary Bloom filter returns the positive result for at least one of the elements of the second bucket, then repeatedly generating new temporary Bloom filters until a temporary Bloom filter that returns the positive result for none of the elements of the second bucket is generated.

15. A method as recited in claim 14, wherein generating the new temporary Bloom filters comprises using a new seed value for a set of hash functions used to create the new temporary Bloom filters.

16. One or more computer storage media having stored thereon instructions that, when executed by one or more processors of a computing device, cause the one or more processors to:
obtain data that is an element of either a first data set of elements or a second data set of elements, wherein the first data set and the second data set are disjoint;
determine a single Bloom filter that corresponds to the element, the single Bloom filter being one of multiple Bloom filters associated with the first data set, each of the multiple Bloom filters corresponding to different elements of the first data set; and
use the single Bloom filter to determine whether the element is part of the first data set of elements or the second data set of elements,
wherein to determine the single Bloom filter that corresponds to the element is to:
generate a hash value for the element using a hash function; and
identify as the single Bloom filter a Bloom filter of the multiple Bloom filters that has an index value that is the same as the hash value.

17. One or more computer storage media as recited in claim 16, wherein the hash function is a same hash function as was previously used to assign elements of the first data set to a first set of buckets associated with the multiple Bloom filters during creation of the multiple Bloom filters.

* * * * *